US011486626B2

(12) United States Patent
Ickes et al.

(10) Patent No.: US 11,486,626 B2
(45) Date of Patent: *Nov. 1, 2022

(54) STANDOFF FEATURE FOR APPLIANCE

(71) Applicant: WHIRLPOOL CORPORATION, Benton Harbor, MI (US)

(72) Inventors: Jacob Charles Ickes, Baroda, MI (US); Dustin Michael Miller, South Bend, IN (US); Abhay Naik, Stevensville, MI (US); Aaron Michael Stewart, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/386,852

(22) Filed: Jul. 28, 2021

(65) Prior Publication Data

US 2021/0356198 A1 Nov. 18, 2021

Related U.S. Application Data

(63) Continuation of application No. 16/567,080, filed on Sep. 11, 2019, now Pat. No. 11,085,691.

(51) Int. Cl.
*F25D 23/06* (2006.01)
*F25D 23/08* (2006.01)

(52) U.S. Cl.
CPC ......... *F25D 23/066* (2013.01); *F25D 23/062* (2013.01); *F25D 23/067* (2013.01); *F25D 23/085* (2013.01); *F25D 2201/14* (2013.01)

(58) Field of Classification Search
CPC .... F25D 23/066; F25D 23/067; F25D 23/082; F25D 23/085; F25D 2323/06
See application file for complete search history.

(56) References Cited

U.S. PATENT DOCUMENTS

| 2,386,387 | A |   | 10/1945 | Drake |
| 2,809,764 | A |   | 10/1957 | Diamond |
| 4,311,351 | A |   | 1/1982 | Chang |
| 5,992,960 | A | * | 11/1999 | Wolanin .................. F25D 21/04 |
|   |   |   |   | 312/265.5 |

(Continued)

FOREIGN PATENT DOCUMENTS

| WO | 2017192121 A1 | 11/2017 |
| WO | 2018044274 A1 | 3/2018 |
| WO | 2018151705 A1 | 8/2018 |

*Primary Examiner* — Daniel J Rohrhoff
(74) *Attorney, Agent, or Firm* — Price Heneveld LLP

(57) ABSTRACT

A standoff feature for an appliance includes a connecting member having a first end and a second end. A first side member extends in a first direction from the first end of the connecting member. A second side member is spaced from the first side member. The second side member extends in the first direction from the second end of the connecting member. A first flange extends from a first side edge of the connecting member. The first side edge extends between the first end and the second end. The first flange extends in a second direction from the connecting member. A second flange extends from a second side edge of the connecting member. The second side edge extends between the first end and the second end and opposes the first side edge. The second flange extends in the second direction from the connecting member.

20 Claims, 9 Drawing Sheets

(56) References Cited

U.S. PATENT DOCUMENTS

| | | | |
|---|---|---|---|
| 6,655,766 B2 | 12/2003 | Hodges | |
| 8,943,770 B2 | 2/2015 | Sanders et al. | |
| 9,643,661 B2 | 5/2017 | Kosaka | |
| 10,914,513 B1* | 2/2021 | Dhage | F25D 25/02 |
| 11,085,691 B2* | 8/2021 | Ickes | F25D 23/085 |
| 11,221,175 B1* | 1/2022 | Bardouche | F25D 23/067 |
| 2016/0258671 A1* | 9/2016 | Allard | F25D 23/085 |
| 2018/0266752 A1* | 9/2018 | Mizuno | F25D 17/04 |
| 2018/0311884 A1 | 11/2018 | Allard et al. | |
| 2019/0128594 A1* | 5/2019 | Allard | F25D 23/082 |
| 2019/0162465 A1* | 5/2019 | Allard | F25D 23/028 |
| 2019/0170174 A1* | 6/2019 | Deka | F16B 11/006 |
| 2019/0170431 A1* | 6/2019 | Naik | F25D 23/085 |

\* cited by examiner

STANDOFF FEATURE FOR APPLIANCE

CROSS-REFERENCE TO RELATED APPLICATIONS

This application is a continuation of and claims priority to U.S. patent application Ser. No. 16/567,080, filed on Sep. 11, 2019, entitled "STANDOFF FEATURE FOR APPLIANCE," now issued as U.S. Pat. No. 11,085,691, the disclosure to which is hereby incorporated herein by reference in its entirety.

FIELD OF THE DISCLOSURE

The present disclosure generally relates to a standoff feature, and more specifically, to a standoff feature for an appliance.

BACKGROUND OF THE DISCLOSURE

Appliances are often a combination of several panels assembled in a selected configuration. The panels are often adhered, fastened, or otherwise coupled together to form the appliance.

SUMMARY OF THE DISCLOSURE

According to one aspect of the present disclosure, a standoff assembly for an appliance includes a trim breaker defining a channel. A standoff feature is disposed within the channel. The standoff feature includes a connecting member disposed proximate a bottom surface within the channel. The connecting member has a first end and a second end that opposes the first end. A first side member is disposed proximate a first side surface within the channel. The first side member extends from the first end of the connecting member. A second side member is disposed proximate a second side surface within the channel. The second side member extends from the second end of the connecting member. At least one flange extends from at least one side edge of the connecting member. The at least one side edge extends between the first end and the second end. The at least one side flange extends toward the bottom surface. At least one tapered projection extends from each of the first side member and the second side member and toward one of the first side surface and the second side surface.

According to another aspect of the present disclosure, a standoff feature for an appliance includes a connecting member having a first end and a second end. A first side member extends in a first direction from the first end of the connecting member. A second side member is spaced from the first side member. The second side member extends in the first direction from the second end of the connecting member. A first flange extends from a first side edge of the connecting member. The first side edge extends between the first end and the second end. The first flange extends in a second direction from the connecting member. A second flange extends from a second side edge of the connecting member. The second side edge extends between the first end and the second end and opposes the first side edge. The second flange extends in the second direction from the connecting member.

According to yet another aspect of the present disclosure, a standoff feature includes a base. The base includes a first side member coupled to a second side member via a connecting member. The first side member and the second side member extend from opposing ends of the connecting member. A plurality of tapered projections extends from the base. The plurality of tapered projections includes a first tapered projection extending from a first edge of the first side member. The first tapered projection extends along a length of the first side member. A second tapered projection extends from a second edge of the first side member. The first edge opposes the second edge. The second tapered projection extends along the length of the first side member. A third tapered projection extends from a first edge of the second side member. The first tapered projection extends along a length of the second side member. A fourth tapered projection extends from a second edge of the second side member. The first edge of the second side member opposes the second edge of the second side member. The fourth tapered projection extends along the length of the second side member.

These and other features, advantages, and objects of the present disclosure will be further understood and appreciated by those skilled in the art by reference to the following specification, claims, and appended drawings.

Figure 1:
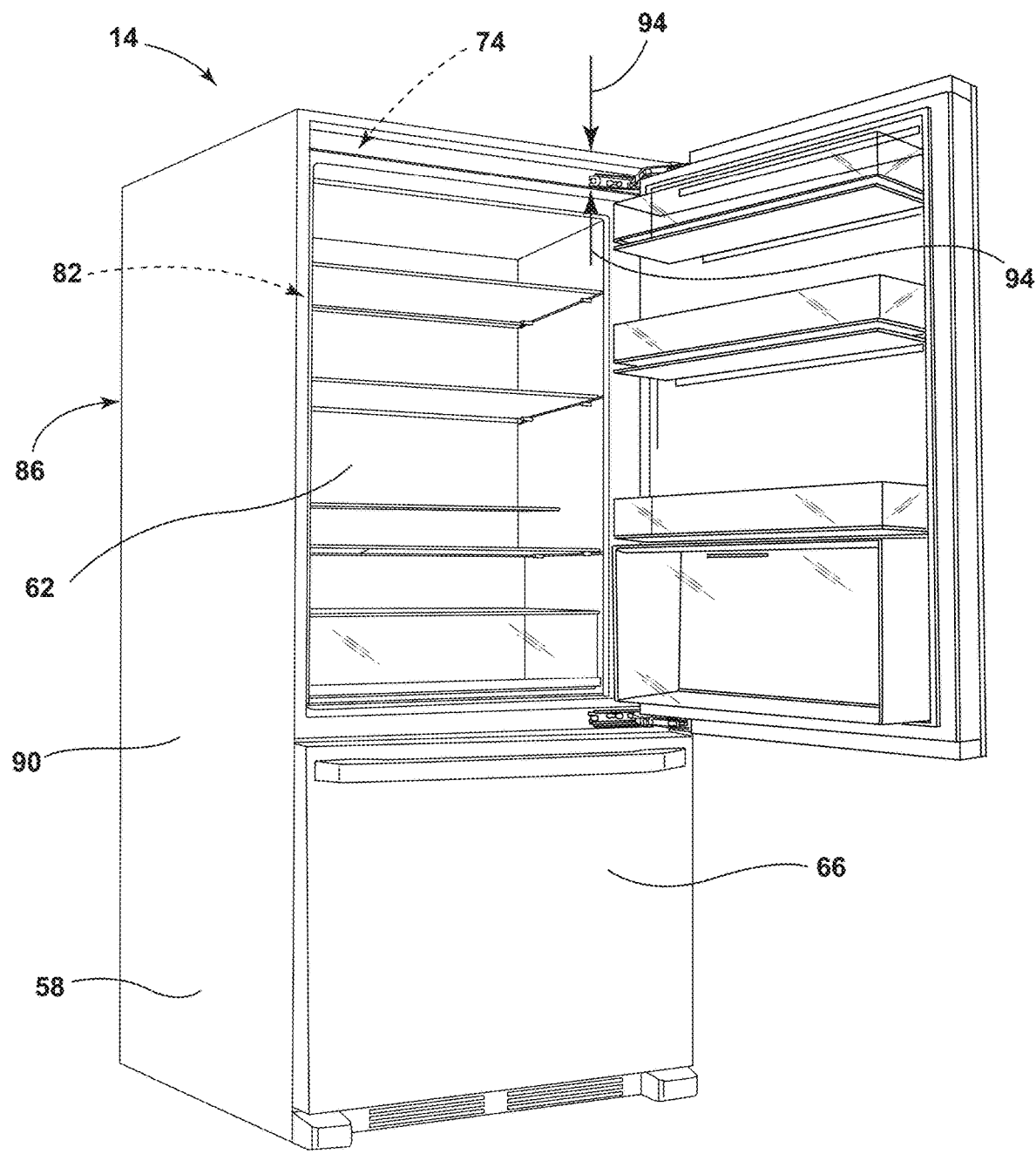
FIG. 1 is a front perspective view of an appliance, according to one example.

The components in the figures are not necessarily to scale, emphasis instead being placed upon illustrating the principles described herein.

DETAILED DESCRIPTION

The present illustrated embodiments reside primarily in combinations of method steps and apparatus components related to a standoff feature for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates a standoff assembly for an appliance 14 that includes a trim breaker 18 that defines a channel 22. A standoff feature 26 is disposed on a bottom surface 30 within the channel 22. The standoff feature 26 includes a base 34 with a horizontal flange 36 and a vertical tapered projection 42. An adhesive 46 is disposed within the channel 22 that is defined by the trim breaker 18. An outer wrapper 50 has an outer edge 54. The outer edge 54 is disposed within the channel 22 that is defined by the trim breaker 18.

Figure 2:
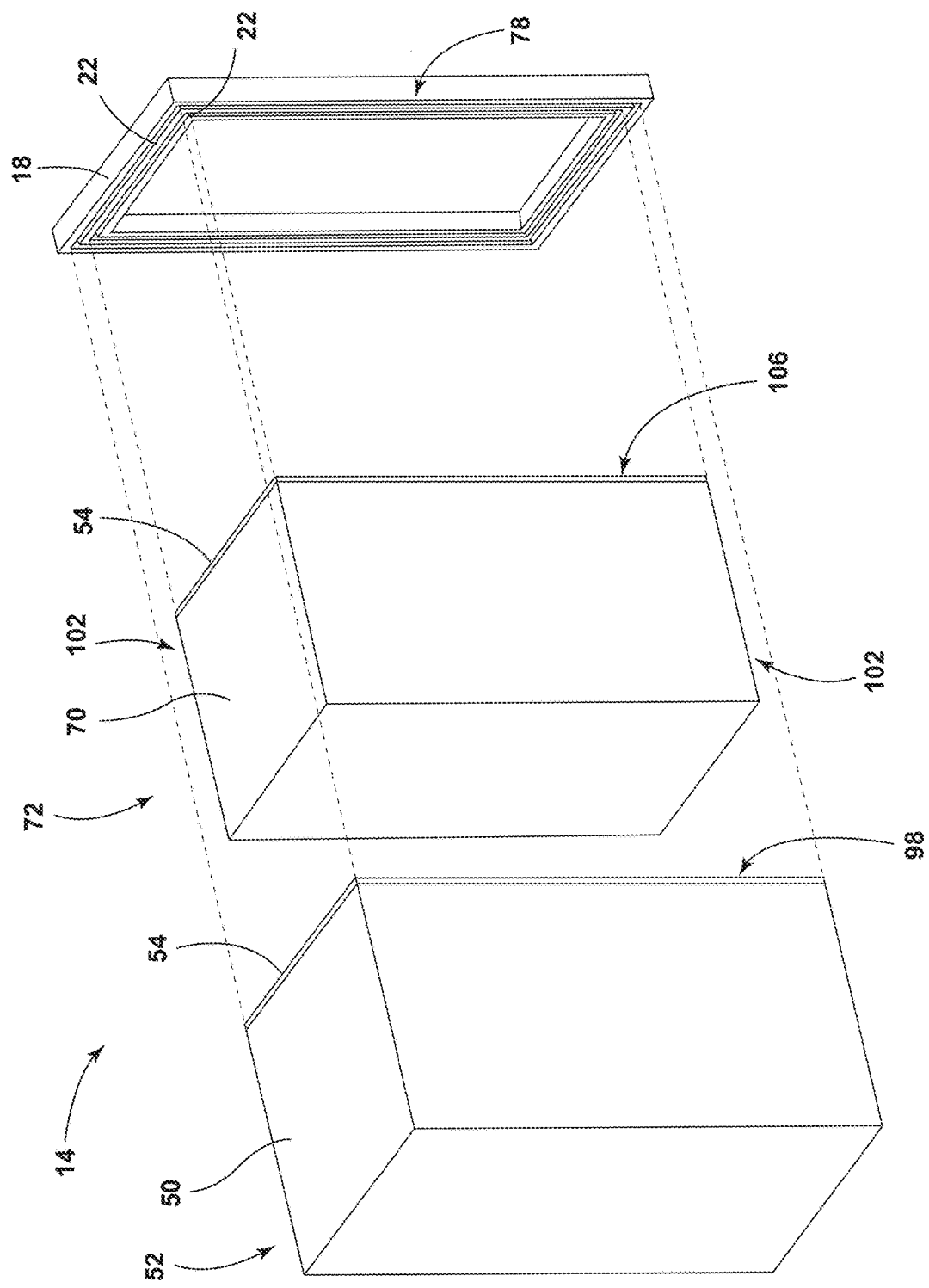
FIG. 2 is an exploded top perspective view of an insulating appliance, according to one example.

Referring to FIGS. 1 and 2, the appliance 14 is illustrated as a refrigerator having a cabinet 58 defining refrigerator and freezer compartments 62, 66. While illustrated as a bottom mount refrigerator, the appliance 14 may be, for example, a bottom mount French door refrigerator, a top mount refrigerator, a side-by-side refrigerator, a 4-door French door refrigerator, and/or a 5-door French door refrigerator. Further, the present disclosure is not limited to refrigerators. The appliance 14 may be, for example, freezers, coolers, ovens, dishwashers, laundry appliances, water heaters, vacuum insulated structures, and other similar appliances and fixtures within household and commercial settings.

The appliance 14 is illustrated in FIGS. 1 and 2 as an insulating appliance 14, which includes at least the trim breaker 18, the outer wrapper 50, and an inner liner 70. The outer wrapper 50 may include a plurality of outer wrapper panels 52 and the inner liner 70 may include a plurality of inner liner panels 72. However, in alternate configurations of the appliance 14, panels of the appliance 14 (e.g., the trim breaker 18, the plurality of outer wrapper panels 52, and the plurality of inner liner panels 72) may be configured as other components. The outer wrapper 50 and the inner liner 70 are coupled to the trim breaker 18 to define an insulating cavity 74 in which one or more insulation materials 78 may be disposed. The insulation materials 78 may be carbon-based powder and/or silicon oxide based materials, however, it is generally contemplated that other insulation materials 78 may be used. Additionally, the insulation materials 78 can be free-flowing materials that can be poured, blown, compacted, or otherwise disposed within the insulating cavity 74. This free-flowing material can be in the form of various silica-based materials, such as fumed silica, precipitated silica, nano-sized and/or micro-sized aerogel powder, rice husk ash powder, perlite, glass spheres, hollow glass spheres, cenospheres, diatomaceous earth, combinations thereof, and any other similar insulating particulate material. The one or more insulation materials 78 substantially fill the insulating cavity 74, forming a substantially continuous layer between the outer wrapper 50 and the inner liner 70. A vacuum 82, or at least a partial vacuum 82, may be defined within the insulating cavity 74 where the vacuum 82 defines a pressure differential 86 between an exterior 90 of the appliance 14 and the insulating cavity 74. This pressure differential 86 serves to define an inward compressive force 94 that is exerted upon both the outer wrapper 50 and the inner liner 70, and tends to bias the outer wrapper 50 and the inner liner 70 toward the insulating cavity 74 of the appliance 14. The vacuum 82 within the insulating cavity 74 also tends to cause gas to infiltrate into the insulating cavity 74 from an area exterior to the appliance 14. This infiltration of gas is sometimes referred to as gas permeation.

The outer wrapper 50 and the inner liner 70 may be configured to form the cabinet 58 of the appliance 14. In this way, the outer wrapper 50 has a three-dimensional shape and defines a central cavity 98. The inner liner 70 may correspond with the outer wrapper 50 and may have a plurality of surfaces 102 on the plurality of outer wrapper panels 52 that define an inner cavity 106. It is generally contemplated that the inner liner 70 may be received within the central cavity 98 of the outer wrapper 50, thus partially defining the insulating cavity 74. Additionally, the outer wrapper 50 and the inner liner 70 may include materials capable of, at least partially, resisting, bending, biasing, or otherwise being formed in response to the inward compressive force 94. These materials for the trim breaker 18 and the outer wrapper 50 may include, but are not limited to, metals, plastics, polymers, metal alloys, combinations thereof, and other similar substantially rigid materials that can be used for vacuum insulated structures within appliances 14.

It is contemplated that the trim breaker 18 may be coupled to the outer edges 54 of the outer wrapper 50 and/or the inner liner 70. As illustrated in FIG. 2, the trim breaker 18 has a generally rectangular shape, however, it is contemplated that other geometric shapes known in the art may be used. In this way, the trim breaker 18 may not substantially interfere with access to the refrigerator and freezer compartments 62, 66 defined by the cabinet 58. The channel 22 may be defined around a perimeter of the trim breaker 18. The channel 22 may be configured to receive the outer edges 54 of the outer wrapper 50 and/or the inner liner 70. It is also contemplated that the trim breaker 18 may define more than one channel 22 to accommodate the outer wrapper 50 and the inner liner 70 in separate channels 22. The channel 22 may be filled with the adhesive 46 (FIG. 8), such as, for example, an epoxy. The adhesive 46 is configured to couple the outer wrapper 50 and/or the inner liner 70 with the trim breaker 18.

Figure 3:
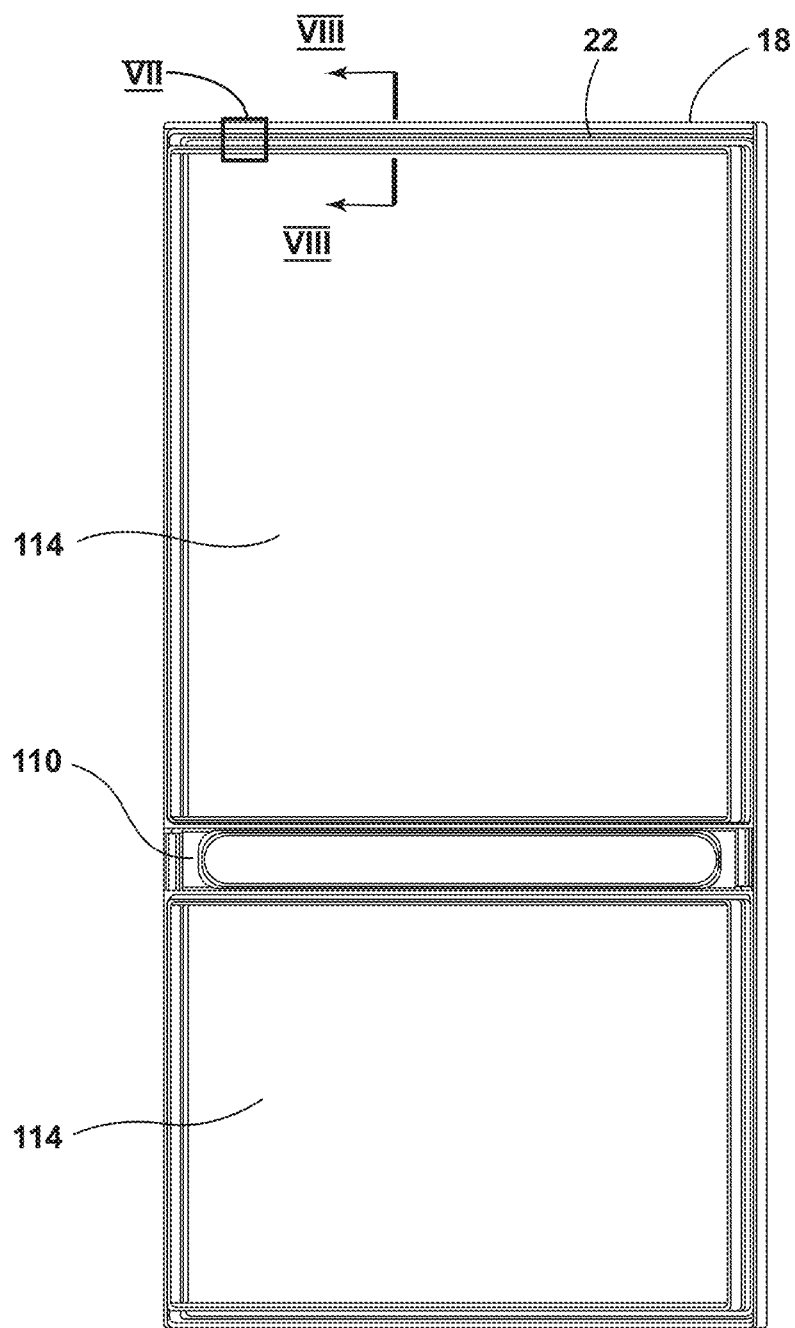
FIG. 3 is a rear elevational view of a trim breaker of an appliance, according to one example.

Referring to FIGS. 1 and 3, in various configurations, the trim breaker 18 may include a cross member 110 to define apertures 114 corresponding to the refrigerator and freezer compartments 62, 66 of the appliance 14. The channel 22 defined by the trim breaker 18 may extend around the perimeter of the trim breaker 18 as well as along the cross member 110. Additionally or alternatively, the trim breaker 18 may define at least one channel 22 around the perimeter of the aperture 114 corresponding with the refrigerator compartment 62 and at least one channel 22 around the perimeter of the aperture 114 corresponding to the freezer compartment 66. It is contemplated that the configuration of the channel 22 may depend on the configuration of the appliance 14.

Figure 4:
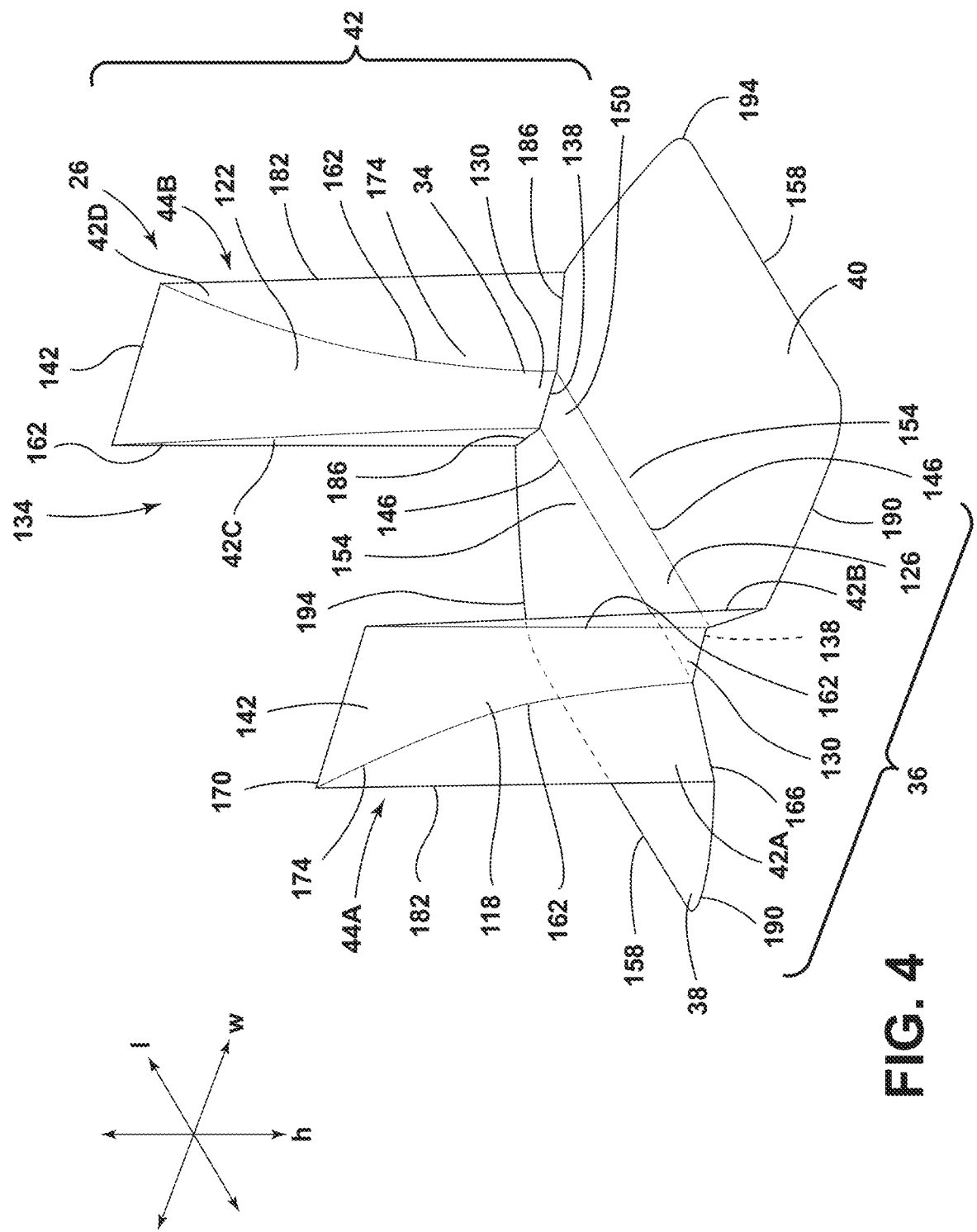
FIG. 4 is a top perspective view of a standoff feature, according to one example.
Figure 5:
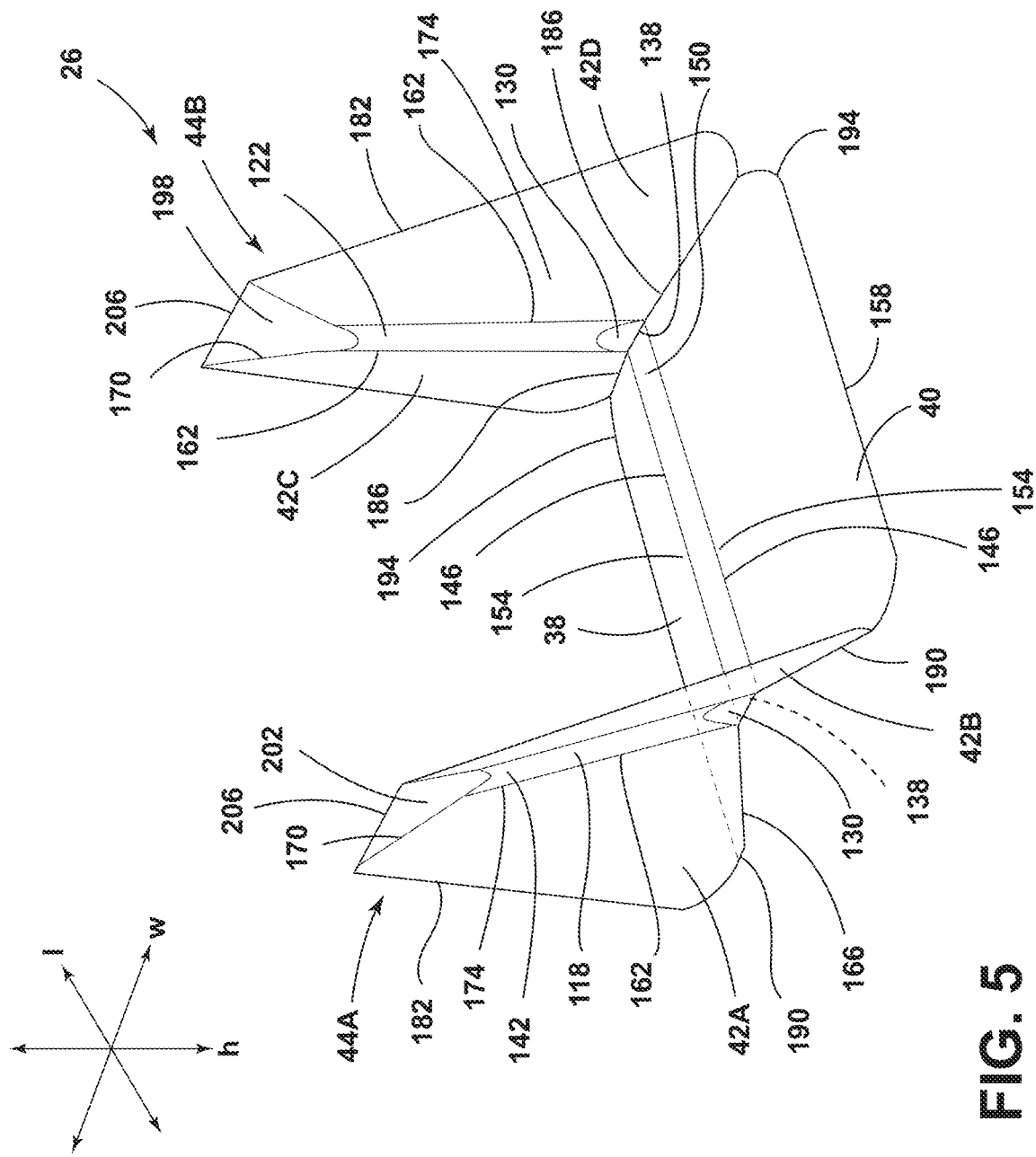
FIG. 5 is a top perspective view of a standoff feature, according to one example.
Figure 6:
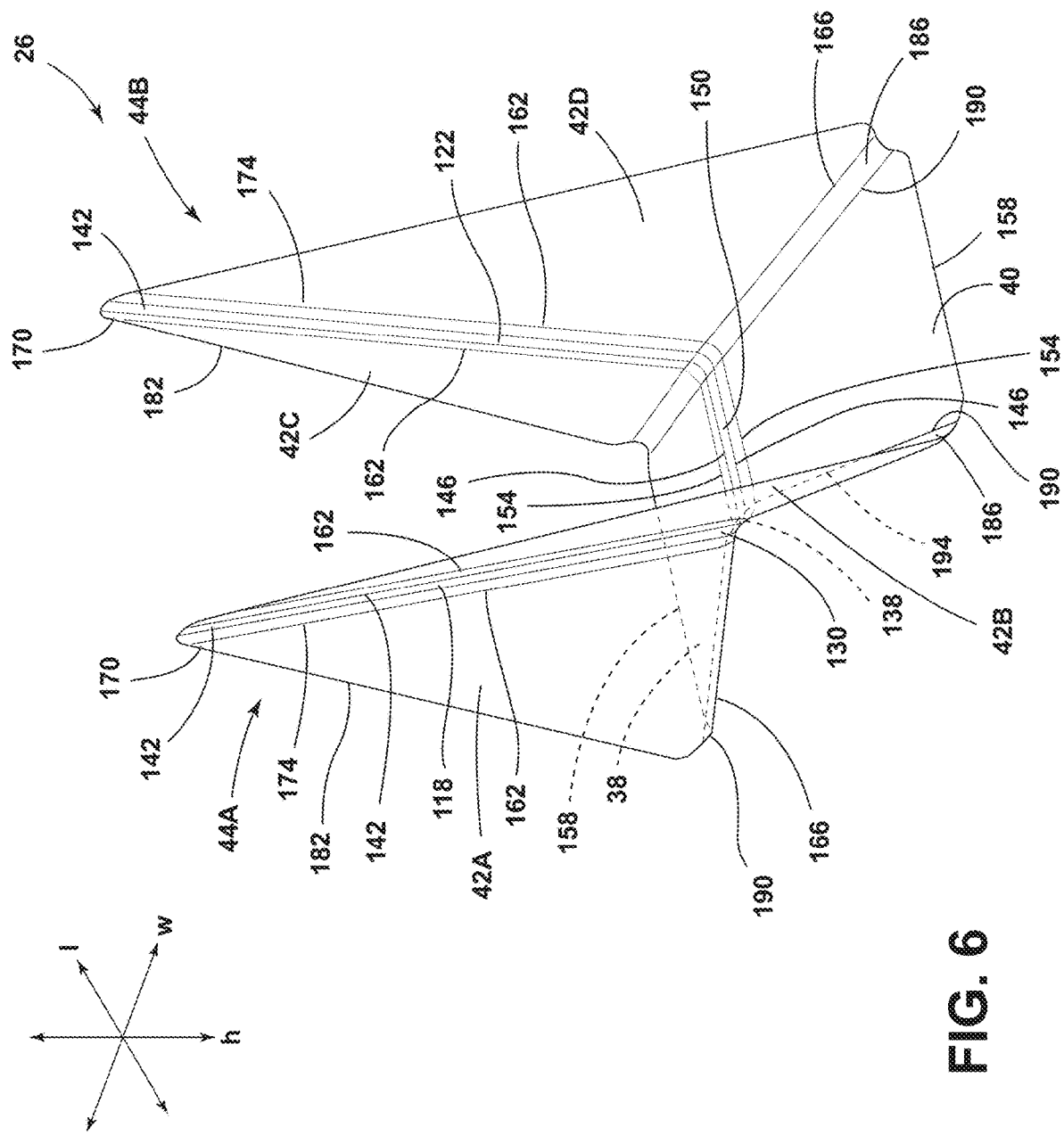
FIG. 6 is a top perspective view of a standoff feature, according to one example.

With reference to FIGS. 4-6, the standoff feature 26 may be disposed within the channel 22 defined by the trim breaker 18 (FIG. 2). The standoff feature 26 includes the base 34. The base 34 may include a first vertical member 118 and a second vertical member 122 coupled via a horizontal member 126 therebetween. The horizontal member 126 may be coupled to lower portions 130 of the first and second vertical members 118, 122 to form a generally U-shaped standoff feature 26. Stated differently, the first and second vertical members 118, 122 may be spaced-apart from one another and define an opening 134 therebetween. Further, the first and second vertical members 118, 122 may extend vertically upward from first opposing edges 138 of the horizontal member 126. The first and second vertical members 118, 122 may be arranged generally parallel to one another. According to various aspects, the first and second vertical members 118, 122 may be generally linear. In this way, the lower portions 130 and upper portions 142 of the first and second vertical members 118, 122 may be substantially vertically aligned with one another. The lower and upper portions 130, 142 may also be substantially vertically aligned with the first opposing edges 138 of the horizontal member 126.

Additionally or alternatively, the first and second vertical members 118, 122 may be arcuate and/or curved. In such an example, and as illustrated in FIG. 4, the first and second vertical members 118, 122 may arc away from one another as the first and second vertical members 118, 122 extend further from the horizontal member 126. In this way, the lower portions 130 of the first and second vertical members 118, 122 may align with the first opposing edges 138 of the horizontal member 126, but the upper portions 142 of the first and second vertical members 118, 122 may not. As illustrated, the first and second vertical members 118, 122 extend a substantially same distance from the horizontal member 126, however, it is also contemplated that the first and second vertical members 118, 122 may extend different distances from the horizontal member 126, based on the selected configuration of the standoff feature 26.

Referring still to FIGS. 4-6, the first and second vertical members 118, 122 may increase in width as the first and second vertical members 118, 122 extend away from the horizontal member 126. In this way, a width of the lower portions 130 of the first and second vertical members 118, 122 may be less than a width of the upper portions 142 of the first and second vertical members 118, 122. The width may increase gradually, exponentially, in steps, and/or in irregular patterns. Further, the first and second vertical members 118, 122 are illustrated as substantially similar shapes and sizes, however, it is contemplated that the first and second vertical members 118, 122 may have different shapes and/or sizes based on the selected configuration of the standoff feature 26.

The horizontal member 126 may extend between the first and second vertical members 118, 122. The horizontal member 126 may have a substantially similar width along the entire length of the horizontal member 126. In this way, the first and second vertical members 118, 122 coupled to the horizontal member 126 may be horizontally aligned with one another.

Referring still to FIGS. 4-6, the standoff feature 26 may include the horizontal flange 36. As illustrated, the standoff feature 26 includes first and second horizontal flanges 38, 40 extending in opposing directions from second opposing edges 146 of the horizontal member 126. However, it is also contemplated that fewer or more horizontal flanges 36 may be included in the standoff feature 26 without departing from the teachings herein. The first and second horizontal flanges 38, 40 may extend a substantially same distance from the horizontal member 126 of the base 34. In this way, the first and second horizontal flanges 38, 40 may have substantially similar widths. It is also contemplated that the first and second horizontal flanges 38, 40 may be different sizes and/or shapes. The first and second horizontal flanges 38, 40 may slope downward at an angle from an inner surface 150 of the horizontal member 126 of the base 34. In this way, proximal edges 154 of the first and second horizontal flanges 38, 40 coupled to the horizontal member 126 may be vertically offset from distal edges 158 of the first and second horizontal flanges 38, 40. It is contemplated that the first and second horizontal flanges 38, 40 may extend at substantially similar, or alternatively, at different angles relative to the base 34. Moreover, according to various aspects, the horizontal member 126 of the base 34 and the first and second horizontal flanges 38, 40 may form a generally parabolic shape with a vertex of the parabolic shape at the highest point (e.g., the inner surface 150 of the horizontal member 126). Further, the horizontal member 126 of the base 34 and the first and second horizontal flanges 38, 40 may form a continuous smooth surface to reduce and/or prevent entrainment of gaseous bubbles (e.g., air bubbles) within the adhesive 46 (FIG. 8) and/or the channel 22 proximate the standoff feature 26.

In various examples, the base 34 may include the vertical tapered projection 42 extending therefrom. As illustrated in each of the examples depicted in FIGS. 4-6, the standoff feature 26 includes a first pair of vertical tapered projections 44A extending from the first vertical member 118 and a second pair of vertical tapered projections 44B extending from the second vertical member 122. While illustrated having the four individual vertical tapered projections 42A-42D, it is understood that any number of vertical tapered projections 42 may be included in standoff feature 26. The first and second pairs of vertical tapered projections 44A, 44B may extend outwardly from opposing side edges 162 of the first and second vertical members 118, 122, respectively.

Referring still to FIGS. 4-6, the vertical tapered projections 42A-42D each include a lower edge 166 and an upper edge 170. A width of the lower edge 166 may be greater than the width of the upper edge 170. The widths may decrease in a gradual, an exponential, a stepped, and/or an irregular manner. In examples where the first and second vertical members 118, 122 have the upper portions 142 with a greater width than the lower portions 130, the decreasing widths of the vertical tapered projections 42A-42D, from the lower edges 166 to upper edges 170, may correspond with the increasing width of the first and second vertical members 118, 122. In this way, inside edges 174 of the vertical tapered projections 42A-42D may be arcuate and/or curved to follow the arcuate opposing side edges 162 of the first and second vertical members 118, 122, respectively. The upper portion 142 of first vertical member 118 and outside edges 182 of the vertical tapered projections 44A, 44B form a substantially rectangular shape. Similarly, the upper portion 142 of the second vertical member 122 and the outside edges 182 of the vertical tapered projections 44A, 44B may also be arranged to form a substantially rectangular shape. The outside edges 182 of the vertical tapered projections 42A-42D may be substantially vertical and may be oriented substantially perpendicular to the horizontal member 126.

According to various aspects, the inside edges 174 of the vertical tapered projections 42A-42D may be coupled along the entire height of the opposing side edges 162 of the first and second vertical members 118, 122, respectively. Each of the vertical tapered projections 42A-42D extends outward at an angle away from the base 34 of the standoff feature 26. In various examples, the first and second pairs of vertical tapered projections 44A, 44B extend outward from the base 34 at an angle in a range of from approximately 30° to approximately 60°. Each of the vertical tapered projections 42A-42D may extend away from the base 34 at a substantially similar angle or, alternatively, may extend away from the base 34 at different angles. The vertical tapered projections 42A, 42B of the first pair of vertical tapered projections 44A may have a similar configuration as the vertical tapered projections 42C, 42D of the second pair of vertical tapered projections 44B, or alternatively, may have different configurations than that of the vertical tapered projections 42C, 42D. Moreover, the first and second vertical members 118, 122 of the base 34 and the vertical tapered projections 42A-42D may form generally parabolic shapes, respectively, with vertices of the parabolic shapes at the innermost points oriented toward one another. According to various aspects, the first and second vertical members 118, 122 of the base 34 and vertical tapered projections 42A-42D may form continuous smooth surfaces that prevent and/or reduce entrainment of gaseous bubbles within the adhesive 46 (FIG. 8) and/or the channel 22.

Referring still to FIGS. 4-6, the standoff feature 26 may be formed of separate components coupled together. Alternatively, part or all of the components of the standoff feature 26 may be integrally formed. In some examples, the standoff feature 26 may be a single unitary member. For example, the vertical tapered projections 42A-42D and the first and second vertical members 118, 122, respectively, may be integrally formed to produce continuous smooth surfaces. Further, the horizontal member 126 and the first and second horizontal flanges 38, 40 may be integrally formed to produce a continuous smooth surface. The continuous surfaces may be advantageous for reducing and/or preventing gaseous bubble entrainment and/or entrapment within the adhesive 46 (FIG. 8) and/or the channel 22. According to various aspects, the first and second vertical members 118, 122 may be integrally formed with the horizontal member 126 and/or the vertical tapered projections 42A-42D may be integrally formed with the first and second horizontal flanges 38, 40. The assembly of the various components of the standoff feature 26 may result in inner corners 186 formed between the first and second vertical members 118, 122 and the horizontal member 126, as well as between the vertical tapered projections 42A-42D and the first and second horizontal flanges 38, 40, respectively. In various examples, the inner corners 186 may be filleted to produce a more continuous surface between adjacent components. This may be advantageous for promoting the reduction of gaseous bubble entrainment within the channel 22 and/or within the adhesive 46 (FIG. 8) proximate the standoff feature 26.

In various examples, the lower edges 166 of the vertical tapered projections 42A-42D may be coupled to the first and second horizontal flanges 38, 40. The lower edges 166 of the vertical tapered projections 42A, 42B may be coupled to first side edges 190 of the first and second horizontal flanges 38, 40, and the lower edges 166 of the vertical tapered projections 42C, 42D may be coupled to opposing second side edges 194 of the first and second horizontal flanges 38, 40. At least a portion, or the entirety, of the lower edges 166 of the vertical tapered projections 42A-42D may be coupled to the first and second horizontal flanges 38, 40.

As illustrated in FIG. 4, the vertical tapered projections 42A-42D extend along and are coupled to a portion of the first and second side edges 190, 194 of the first and second horizontal flanges 38, 40. In this way, the vertical tapered projections 42A-42D may not extend the same width as the first and second horizontal flanges 38, 40. However, it is contemplated that at least a portion of the vertical tapered projections 42A-42D may extend a same and/or greater width than the first and second horizontal flanges 38, 40 without departing from the teachings herein.

Additionally or alternatively, the coupling of the vertical tapered projections 42A-42D to the first and second horizontal flanges 38, 40 may alter a length of the first and second horizontal flanges 38, 40. In various aspects, the first and second horizontal flanges 38, 40 may have a substantially same, or similar, length as the horizontal member 126 of the base 34. In this way, the first and second side edges 190, 194 of the first and second horizontal flanges 38, 40 may be aligned with the first opposing edges 138 of the horizontal member 126. Alternatively, the length of the first and second horizontal flanges 38, 40 may vary as a result of being coupled with the vertical tapered projections 42A-42D. The length of the first and second horizontal flanges 38, 40 may increase to follow the outward angles of the vertical tapered projections 42A-42D relative to the base 34. Additionally or alternatively, the length of the first and second horizontal flanges 38, 40 may continue to increase, remain substantially the same, and/or decrease as the first and second horizontal flanges 38, 40 extend beyond the outside edges 182 of the vertical tapered projections 42A-42D.

Referring to FIG. 5, an additional and/or alternative configuration of the standoff feature 26 is illustrated. The first and second vertical members 118, 122 may extend substantially perpendicular from the horizontal member 126, or alternatively, may extend vertically upward at an obtuse angle relative to the horizontal member 126. In examples where the first and second vertical members 118, 122 each extend at the obtuse angle relative to the horizontal member 126, the opening 134 between the first and second vertical members 118, 122 may be increased. The first and second vertical members 118, 122 may extend at same or different obtuse angles, or other angles, without departing from the teachings herein.

In various examples, the first pair of vertical tapered projections 44A (e.g., the vertical tapered projections 42A, 42B) may extend outward from the opposing side edges 162 of the first vertical member 118, and the second pair vertical tapered projections 44B (e.g., the vertical tapered projections 42C, 42D) may extend outward from the opposing side edges 162 of the second vertical member 122. Each of the vertical tapered projections 42A-42D may be substantially similar, or alternatively, different in size, shape, and/or angle relative to the base 34. Further, the outside edges 182 of the tapered projections 42A-42D may be obliquely oriented relative to the first and second vertical members 118, 122, respectively. In this way, the vertical tapered projections 42A-42D may be substantially triangular. As illustrated in FIG. 5, the vertical tapered projections 42A-42D are coupled to at least a substantial portion of the first and second side edges 190, 194 of the first and second horizontal flanges 38, 40. In this way, the lengths of the first and second horizontal flanges 38, 40 may gradually increase from the proximal edges 154 proximate the horizontal member 126 to the distal edges 158, such that the lengths correspond with the outwardly angled configuration of the vertical tapered projections 42A-42D.

The standoff feature 26, as illustrated in FIG. 5, includes a first tapered ramp 198 coupled to the upper portion 142 of the first vertical member 118 of the base 34 and a second tapered ramp 202 coupled to the upper portion 142 of the second vertical member 122. In various examples, the vertical tapered projections 42A-42D may extend a greater height than the first and second vertical members 118, 122 and may be coupled to the first and second tapered ramps 198, 202, respectively. Top edges 206 of the first and second tapered ramps 198, 202 may be substantially horizontal. In this configuration, the top edges 206 of the first and second tapered ramps 198, 202 and the outside edges 182 of the vertical tapered projections 42A-42D define substantially trapezoidal shapes, respectively.

Still referring to FIG. 5, the first and second tapered ramps 198, 202 may be substantially triangular such that the first and second tapered ramps 198, 202 have a greater width proximate the top edges 206 of the first and second tapered ramps 198, 202 than a width proximate the upper portions 142 of the first and second vertical members 118, 122. The first and second tapered ramps 198, 202 may be coplanar with the first and second vertical members 118, 122. Additionally or alternatively, the first and second tapered ramps 198, 202 may extend at an angle outward from the upper portions 142 of the first and second vertical members 118, 122, respectively. In this way, the top edges 206 of the first and second tapered ramps 198, 202 may be offset from the upper portions 142 of the first and second vertical members 118, 122, respectively, and may not be vertically aligned with the upper portions 142 and/or the first opposing edges 138 of the horizontal member 126.

Referring to FIG. 6, another additional and/or alternative configuration of the standoff feature 26 is illustrated. The upper portions 142 of the first and second vertical members 118, 122 may be rounded. The vertical tapered projections 42A-42D may extend upward and may couple to the first and second vertical members 118, 122, respectively, proximate the rounded upper portions 142. In this way, the first and second vertical members 118, 122 with the vertical tapered projections 42A-42D may form substantially triangular shapes. In various aspects, the lower edges 166 of the vertical tapered projections 42A-42D may be coupled to the entire width of the first and second side edges 190, 194 of the first and second horizontal flanges 38, 40, respectively, and form filleted inner corners 186 therebetween. The standoff feature 26, illustrated in FIG. 6, may have a greater height and/or a decreased length relative to the standoff features 26 illustrated in FIGS. 4 and 5.

Figure 7:
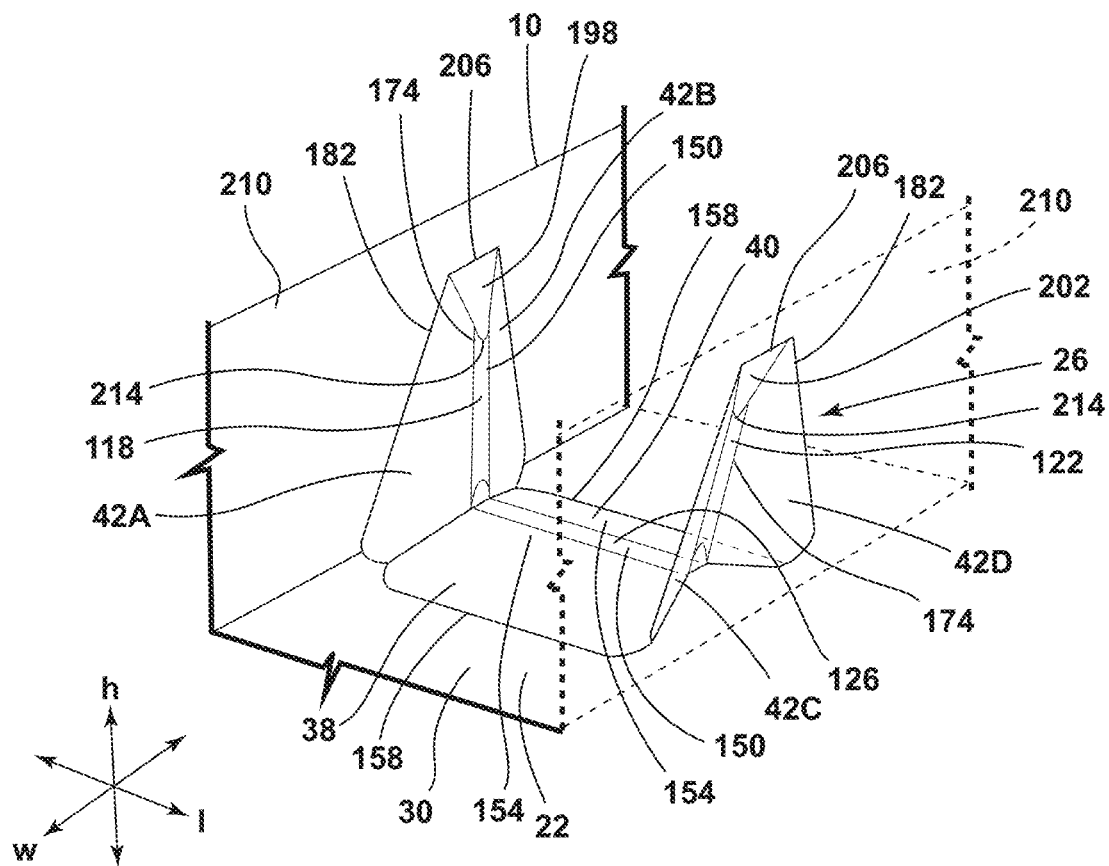
FIG. 7 is a top perspective view of the standoff feature disposed within the channel of the trim breaker of FIG. 3, taken at area VII.

Referring to FIG. 7, the standoff feature 26 is illustrated within the channel 22 that is defined by the trim breaker 18. It is contemplated that any of the standoff features 26 disclosed herein may be disposed within the channel 22, such that FIG. 7 is not limiting but is merely exemplary. The standoff feature 26 may be disposed on the bottom surface 30 of the channel 22 and may abut side surfaces 210 within the channel 22. The side surfaces 210 may be spaced-apart and arranged generally parallel to one another. As such, the length of the standoff feature 26 may substantially correspond with the distance between the side surfaces 210. The height of the standoff feature 26 may substantially correspond with, or alternatively be greater or less than, the height defined within the channel 22.

The first and second horizontal flanges 38, 40 may extend upward from the distal edges 158 disposed flush with the bottom surface 30 within the channel 22 to the proximal edges 154 disposed flush with the inner surface 150 of the horizontal member 126. In various examples, the horizontal member 126 may be spaced-apart from the bottom surface 30 as a result of the angled orientation of the first and second horizontal flanges 38, 40. In a non-limiting example, the horizontal member 126 may be spaced-apart from the bottom surface 30 by about 1 mm and the first and second horizontal flanges 38, 40 may each have a width of about 2 mm. In another non-limiting example, the horizontal member 126 may be spaced-apart from the bottom surface 30 by about 2 mm and the first and second horizontal flanges 38, 40 may each have a width of about 4 mm. Further, according to various aspects, the vertical tapered projections 42A-42D may extend at an angle from the outside edges 182 disposed flush with the side surfaces 210 within the channel 22 to inside edges 174 disposed flush with the inner surfaces 150 of the first and second vertical members 118, 122, respectively. Similar to the horizontal member 126, the first and second vertical members 118, 122 may be spaced apart from the side surfaces 210 as a result of the angled orientation of the vertical tapered projections 42A-42D and/or the first and second tapered ramp 198, 202. The first and second tapered ramps 198, 202 may extend from the top edges 206 disposed flush with the side surfaces 210 to bottom edges 214 disposed flush with the inner surfaces 150 of the first and second vertical members 118, 122, respectively. In this way, the standoff feature 26 may form a plurality of smooth surfaces within the channel 22. As illustrated, the standoff feature 26 forms three smooth, continuous surfaces, including one surface disposed over the bottom surface 30 within the channel 22 and one surface disposed adjacent to each of the side surfaces 210 within the channel 22.

Figure 8:
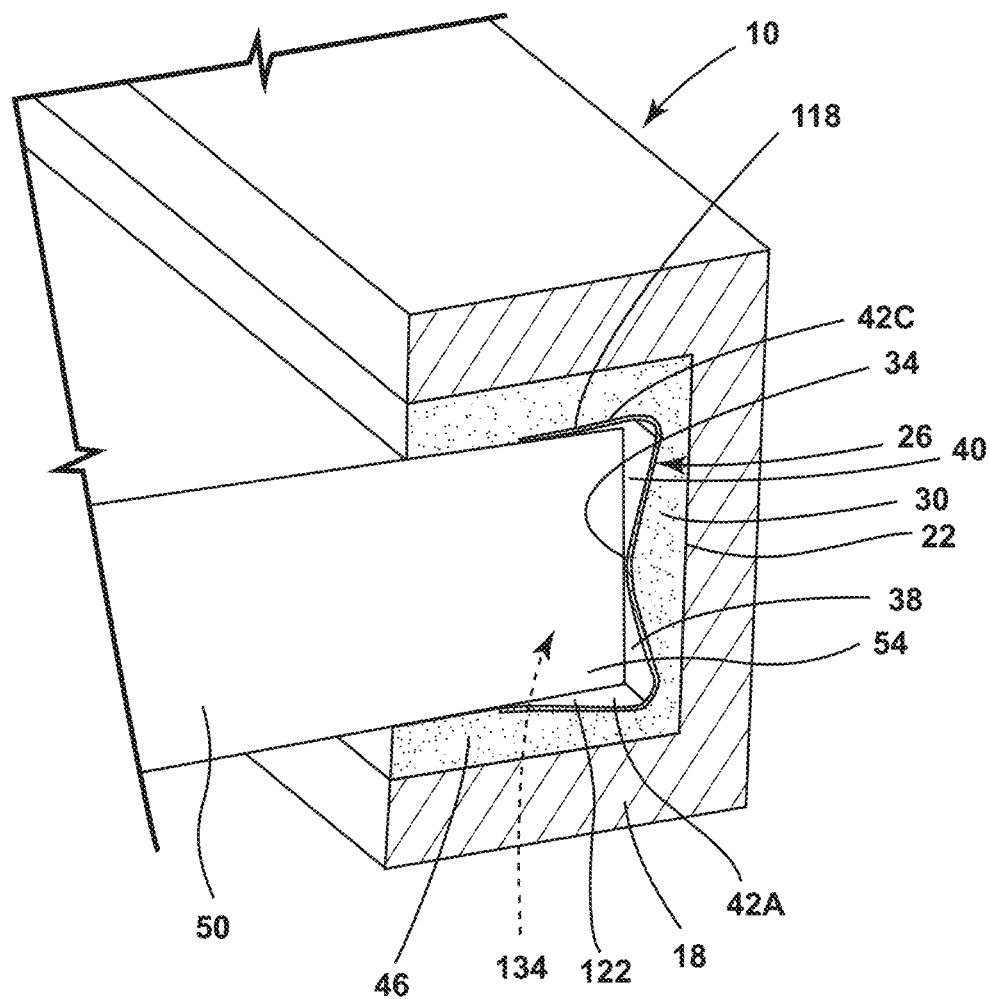
FIG. 8 is a cross-sectional view of the standoff feature disposed within the channel of the trim breaker of FIG. 3, taken along line VIII-VIII.

Referring to FIG. 8, the standoff feature 26 having smooth surfaces may be advantageous to promote reduction of the entrainment of gaseous bubbles relative to gaseous bubble entrainment that can result from the fluid encountering a 90° angle. A standoff assembly 10 for the appliance 14 may be assembled by dispensing the adhesive 46 into the channel 22 with the standoff feature 26 disposed therein and positioning the outer edge 54 of the outer wrapper 50 within the channel 22 in the adhesive 46. The adhesive 46 in the channel 22 may then be cured and additional adhesive 46 may be applied. In various examples, the trim breaker 18 may be formed from plastic materials, but it is understood that other materials may be used. The outer wrapper 50 may be formed from metal materials or metal alloy materials, but it will be understood that other materials may be used. The standoff feature 26 may be disposed within the channel 22 such that the outer edge 54 of the outer wrapper 50 may contact the standoff feature 26 and may be spaced-apart from the bottom surface 30 within the channel 22. Stated differently, the standoff feature 26 may separate the outer edge 54 of the outer wrapper 50 from the trim breaker 18. In this way, the outer edge 54 of the outer wrapper 50 may contact at least the base 34 of the standoff feature 26. While FIG. 8 illustrates the assembly of the trim breaker 18 and the outer wrapper 50, it is also contemplated that the inner liner 70 may be constructed and assembled in a similar manner.

According to various aspects, the standoff feature 26 may be disposed within the channel 22 prior to the insertion of the adhesive 46. It is also contemplated that the adhesive 46 may be dispensed into the channel 22 before and/or after the standoff feature 26 based on the configuration of the standoff assembly 10. The adhesive 46 may be dispensed into the opening 134 defined between the first and second vertical members 118, 122. The smooth surfaces defined by the base 34, the first and second horizontal flanges 38, 40, and/or the vertical tapered projections 42A-42D may promote the reduction of the entrainment of gaseous bubbles within the adhesive 46. Stated differently, the standoff feature 26 may discourage the formation and/or entrainment of gaseous bubbles within the channel 22 and/or within the adhesive 46. In a non-limiting example, the gaseous bubbles may be eliminated from the channel 22 and/or the adhesive. In an additional non-limiting example, the gaseous bubble entrainment may be reduced relative to gaseous bubble entrainment that results from the adhesive 46 encountering a 90° angle.

Figure 9:
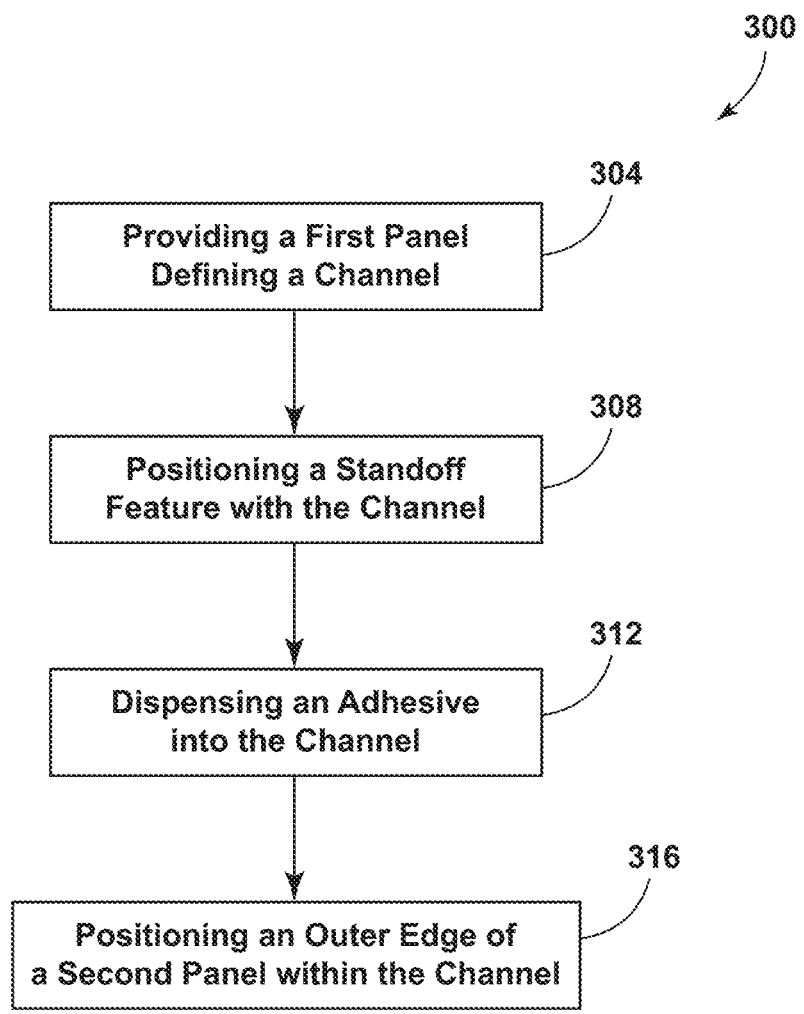
FIG. 9 is a flow diagram of a method of assembly of a standoff assembly for an appliance, according to one example.

Referring to FIG. 9, and with further reference to FIGS. 1-8, a method 300 of assembling the standoff assembly 10 may include a step 304 of providing the trim breaker 18 that defines the channel 22. As illustrated in FIGS. 1 and 2, the appliance 14 includes the trim breaker 18, however, in other configurations of the appliance 14, the trim breaker 18 may be any practicable panel. A next step 308 of the method 300 may include positioning the standoff feature 26 within the channel 22. In various aspects, the step 308 may include positioning more than one standoff feature 26 in the channel 22. In examples having more than one standoff feature 26, the standoff features 26 may be arranged in a spaced-apart configuration relative to another. The standoff features 26 may be disposed at regular or irregular intervals within channel 22. In various aspects, the standoff features 26 may be arranged along the entire channel 22 or arranged in a portion of the channel 22.

A step 312 may include dispensing the adhesive 46 (e.g., the epoxy) into the channel 22 and over the standoff feature 26. The step 312 may also include dispensing the adhesive 46 within the opening 134 defined between the first and second vertical members 118, 122 of the standoff feature 26. The adhesive 46 may be dispensed in a single direction along the channel 22 by a caulk gun or other similar tools. The adhesive 46 may have a laminar flow profile. The smooth surfaces of the standoff feature 26 may reduce gaseous bubble entrainment within the adhesive 46. This may be advantageous for reducing gaseous bubbles that form between the adhesive 46 and the standoff feature 26 and/or the bottom and side surfaces 30, 210 within the channel 22. Moreover, the promotion of the reduction of gaseous bubble entrainment may reduce and/or prevent inclusions and/or stress risers in the appliance 14.

Next, a step 316 may include positioning the outer edge 54 of the outer wrapper 50 within the channel 22 and in the adhesive 46. The step 316 may include positioning the outer edge 54 of the outer wrapper 50 against the horizontal members 126 of the standoff feature 26 in an abutting configuration. The outer edge 54 of the outer wrapper 50 may also be positioned in an abutting configuration with the first and second vertical members 118, 122 of the standoff feature 26. Additionally, the outer edge 54 of the outer wrapper 50 may be positioned in a manner that is spaced-apart from the bottom and/or side surfaces 30, 210 within the channel 22. The step 316 may also include positioning the inner liner 70 within the same and/or an additional channel 22 defined by the trim breaker 18 in a similar manner. Further, in other configurations of the appliance 14, the outer wrapper 50 and the inner liner 70 may be any other practicable feature or panel.

Use of the present disclosure may provide a variety of advantages. For example, the standoff feature 26 may form a buffer between the trim breaker 18 and the outer wrapper 50 and/or the inner liner 70. Additionally, the standoff feature 26 may form smooth surfaces to promote the reduction of gaseous bubble entrainment in the adhesive 46, or another fluid, dispensed within the channel 22. Further, the standoff feature 26, disclosed herein, may have a reduced number of sharp angles (e.g., 90° angles), which can cause the formation of gaseous bubbles in the adhesive 46. In this way, the standoff feature 26 may reduce the size and/or quantity of gaseous bubbles formed within the adhesive 46. This may be advantageous for reducing stress locations within the appliance 14 that can be caused by gaseous bubbles. Further, in insulating appliances 14, the reduction of gaseous bubbles by the standoff feature 26 may provide an airtight seal within the insulating appliance 14. Moreover, the standoff feature 26 may reduce and/or prevent thermal conduction between the trim breaker 18, the outer wrapper 50, and/or the inner liner 70. Additional benefits or advantages of using this device may also be realized and/or achieved.

According to another aspect, a standoff assembly for an appliance includes a trim breaker that defines a channel. A standoff feature is disposed on a bottom surface within the channel. The standoff feature includes a base that has at least one horizontal flange and at least one vertical tapered projection extending therefrom. An adhesive is disposed within the channel that is defined by the trim breaker. An outer wrapper has an outer edge. The outer edge is disposed within the channel that is defined by the trim breaker.

According to another aspect, an outer edge of an outer wrapper contacts a base of a standoff feature and is spaced-apart from a bottom surface within a channel.

According to still another aspect, a base includes a first vertical member and a second vertical member coupled via a horizontal member therebetween.

According to another aspect, at least one horizontal flange includes a first horizontal flange and a second horizontal flange extending in opposing directions from a horizontal member of a base.

According to still another aspect, first and second horizontal flanges extend upward from outer edges flush with a bottom surface to inner edges flush with an inner surface of a horizontal member.

According to another aspect, at least one vertical tapered projection includes a first pair of vertical tapered projections that extend from a first vertical member and a second pair of vertical tapered projections that extend from a second vertical member.

According to yet another aspect, first and second pairs of vertical tapered projections extend from outside edges flush with side surfaces within a channel and inside edges flush with inner surfaces of first and second vertical members, respectively.

According to still another aspect, a base and at least one horizontal flange define a surface to promote a reduction of gaseous bubbles within an adhesive proximate a standoff feature.

According to another aspect, a base and at least one vertical tapered projection define a surface to promote a reduction of gaseous bubbles within an adhesive proximate a standoff feature.

According to yet another aspect, a base includes first and second vertical members that define an opening therebetween. An adhesive and an outer edge of an outer wrapper are disposed within the opening.

According to another aspect, a standoff feature for an appliance includes a base that has first and second vertical members spaced-apart from one another and coupled via a horizontal member. First and second horizontal flanges extend outward from opposing edges of the horizontal member. A first pair of vertical tapered projections extend outward from opposing side edges of the first vertical member. A second pair of vertical tapered projections extend outward from opposing side edges of the second vertical member.

According to another aspect, first and second vertical members each have greater upper widths that are proximate upper edges of first and second pairs of vertical tapered projection than lower widths that are proximate a horizontal member.

According to still another aspect, lower edges of each vertical tapered projection of first and second pairs of vertical tapered projections includes a greater width than upper edges of the vertical tapered projections.

According to yet another aspect, first and second pairs of vertical tapered projections are integrally formed with first and second horizontal flanges that define filleted corners therebetween.

According to another aspect, first and second pairs of vertical tapered projections and first and second vertical members of a base define surfaces, respectively, to promote a reduction of gaseous bubbles in a fluid proximate the base.

According to still another aspect, first and second horizontal flanges and a horizontal member of a base define a surface to promote a reduction of gaseous bubbles in a fluid proximate the base.

According to another aspect, a first tapered ramp is coupled to an upper portion of a first vertical member of a base. A second tapered ramp is coupled to an upper portion of a second vertical member of the base.

According to yet another aspect, a method of assembling a standoff assembly includes providing a trim breaker that defines a channel. More than one standoff features with a plurality of surfaces are positioned in the channel, in a spaced-apart configuration, relative to one another. An adhesive is dispensed into the channel and over the plurality of surfaces of the more than one standoff features. An outer edge of an outer wrapper panel is positioned within the channel and in the adhesive.

According to another aspect, an adhesive is dispensed between vertical members of more than one standoff feature.

According to still another aspect, an outer edge of an outer wrapper is positioned against horizontal members of more than one standoff feature and spaced-apart from a bottom surface within a channel of a trim breaker.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A standoff assembly for an appliance, comprising:
   a trim breaker defining a channel; and
   a standoff feature disposed within the channel, wherein the standoff feature includes:
     a connecting member disposed proximate a bottom surface within the channel, the connecting member having a first end and a second end that opposes the first end;
     a first side member disposed proximate a first side surface within the channel, wherein the first side member extends from the first end of the connecting member;
     a second side member disposed proximate a second side surface within the channel, wherein the second side member extends from the second end of the connecting member;
     at least one flange extending from at least one side edge of the connecting member, the at least one side edge extends between the first end and the second end, wherein the at least one flange extends toward the bottom surface; and
     at least one tapered projection extending from each of the first side member and the second side member, respectively, and toward one of the first side surface and the second side surface, respectively.

2. The standoff assembly of claim 1, wherein the at least one tapered projection includes a first pair of tapered projections extending from opposing edges of the first side member and a second pair of tapered projections extending from opposing edges of the second side member.

3. The standoff assembly of claim 1, wherein the at least one flange includes a first flange and a second flange and the at least one side edge includes a first side edge and a second opposing side edge, wherein the first flange extends in a first direction from the first side edge and the second flange extends from the second opposing side edge in a second direction.

4. The standoff assembly of claim 1, further comprising:
   an outer wrapper disposed within the channel and between the first side member and the second side member of the standoff feature.

5. The standoff assembly of claim 1, further comprising:
an adhesive disposed within the channel over the standoff feature.

6. The standoff assembly of claim 5, wherein the standoff feature defines continuous smooth surfaces to promote a reduction of gaseous bubbles within the adhesive disposed proximate the standoff feature.

7. A standoff feature for an appliance, comprising:
a connecting member having a first end and a second end;
a first side member extending in a first direction from the first end of the connecting member;
a second side member spaced from the first side member, wherein the second side member extends in the first direction from the second end of the connecting member;
a first flange extending from a first side edge of the connecting member, wherein the first side edge extends between the first end and the second end, and wherein the first flange extends in a second direction from the connecting member; and
a second flange extending from a second side edge of the connecting member, wherein the second side edge extends between the first end and the second end and opposes the first side edge, and wherein the second flange extends in the second direction from the connecting member.

8. The standoff feature of claim 7, wherein a distal edge of each of the first flange and the second flange have a width greater than a width of a proximal edge coupled to the connecting member, respectively.

9. The standoff feature of claim 7, further comprising:
a pair of first side tapered projections extending from opposing edges of the first side member; and
a pair of second side tapered projections extending from opposing edges of the second side member.

10. The standoff feature of claim 9, wherein a filleted inner corner is defined between the first flange and at least one of the pair of first side flanges and between the first flange and at least one of the pair of second side flanges.

11. The standoff feature of claim 7, wherein each of the first flange and the second flange extends a same distance from the connecting member, and wherein a proximal edge of each of the first flange and the second flange is offset from a distal edge, respectively.

12. The standoff feature of claim 7, first comprising:
a first tapered ramp coupled to a distal end of the first side member; and
a second tapered ramp coupled to a distal end of the second side member.

13. The standoff feature of claim 12, wherein the first tapered ramp extends at an outward angle from the first side member, and wherein a proximal edge of the first tapered projection coupled to the first side member is offset from a distal edge of the first tapered ramp.

14. A standoff feature, comprising:
a base including a first side member coupled to a second side member via a connecting member, wherein the first side member and the second side member extend from opposing ends of the connecting member; and
a plurality of tapered projections extending from the base, wherein the plurality of tapered projections includes:
a first tapered projection extending from a first edge of the first side member, wherein the first tapered projection extends along a length of the first side member;
a second tapered projection extending from a second edge of the first side member, wherein the first edge opposes the second edge, and wherein the second tapered projection extends along the length of the first side member;
a third tapered projection extending from a first edge of the second side member, wherein the first tapered projection extends along a length of the second side member; and
a fourth tapered projection extending from a second edge of the second side member, wherein the first edge of the second side member opposes the second edge of the second side member, and wherein the fourth tapered projection extends along the length of the second side member.

15. The standoff feature of claim 14, wherein a proximal end of each tapered projection adjacent to the connecting member has a width greater than a width of a distal end of each tapered projection, respectively.

16. The standoff feature of claim 14, further comprising:
a tapered ramp coupled to a distal end of each of the first side member and the second side member, respectively.

17. The standoff feature of claim 14, wherein each tapered projection extends at an angle from the base such that an outer side edge of each tapered projection is offset from an inner side edge coupled to the base.

18. The standoff feature of claim 14, further comprising:
a first flange extending from a first edge of the connecting member, wherein the first edge extends between the opposing ends of the connecting member; and
a second flange extending from a second edge of the connecting member, wherein the second edge opposes the first edge.

19. The standoff feature of claim 18, wherein the first tapered projection and the third tapered projection are coupled to opposing sides of the first flange, and wherein the second tapered projection and the fourth tapered projection are coupled to opposing sides of the second flange.

20. The standoff feature of claim 19, wherein the first tapered projection and the third tapered projection extend from proximate a proximal edge of the first flange to proximate a distal edge of the first flange, and wherein the second tapered projection and the fourth tapered projection extend from proximate a proximal edge of the second flange to proximate a distal edge of the second flange.

* * * * *